United States Patent
Ye et al.

(10) Patent No.: US 9,998,366 B2
(45) Date of Patent: Jun. 12, 2018

(54) SYSTEM, METHOD AND DEVICE FOR FORWARDING PACKET

(71) Applicant: ZTE Corporation, Shenzhen (CN)

(72) Inventors: Ao Ye, Shenzhen (CN); Qi Yang, Shenzhen (CN); Haishan Zhou, Shenzhen (CN); Qing He, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 196 days.

(21) Appl. No.: 14/769,266

(22) PCT Filed: Sep. 17, 2013

(86) PCT No.: PCT/CN2013/083685
§ 371 (c)(1),
(2) Date: Nov. 17, 2015

(87) PCT Pub. No.: WO2014/127629
PCT Pub. Date: Aug. 28, 2014

(65) Prior Publication Data
US 2016/0065458 A1    Mar. 3, 2016

(30) Foreign Application Priority Data

Feb. 21, 2013 (CN) .......................... 2013 1 0055687

(51) Int. Cl.
*H04L 12/28*    (2006.01)
*H04L 12/56*    (2006.01)
(Continued)

(52) U.S. Cl.
CPC ............ *H04L 45/44* (2013.01); *H04L 12/462* (2013.01); *H04L 45/245* (2013.01)

(58) Field of Classification Search
CPC ...... H04L 45/44; H04L 45/245; H04L 12/462
See application file for complete search history.

(56) References Cited

U.S. PATENT DOCUMENTS

2003/0200330 A1    10/2003    Oelke et al.
2004/0081171 A1*   4/2004    Finn ................. H04L 12/462
                                                         370/395.53
(Continued)

FOREIGN PATENT DOCUMENTS

CN    101753438 A    6/2010
CN    102724030 A    10/2012
(Continued)

OTHER PUBLICATIONS

International Search Report for corresponding application PCT/CN2013/083685 filed Sep. 17, 2013; dated Dec. 19, 2013.
(Continued)

*Primary Examiner* — Kiet Tang
(74) *Attorney, Agent, or Firm* — Cantor Colburn LLP (57) ABSTRACT

Provided are a system, a method and a device for forwarding a packet. The system comprises: an LCC comprising a first LCC's control ether switch unit and a second LCC's control ether switch unit, a first CFC comprising a first CFC's control ether switch unit, and a second CFC comprising a second CFC's control ether switch unit, wherein a control message channel and a protocol packet channel are separately arranged between the first and the second LCC's control ether switch units and the first and the second CFC's control ether switch units. Through the disclosure, the problem that the reliability and security of the cluster-based router may be reduced if the control message and the protocol packet are transmitted in the same channel in the related arts is solved, so as to achieve the effects of forwarding the control message and the protocol packet in a cluster-based router separately and enhancing the reliability and the security of the cluster-based router.

9 Claims, 7 Drawing Sheets

(51) Int. Cl.
*H04L 12/721* (2013.01)
*H04L 12/46* (2006.01)
*H04L 12/709* (2013.01)

(56) References Cited

U.S. PATENT DOCUMENTS

| | | |
|---|---|---|
| 2008/0316919 A1 | 12/2008 | Shi et al. |
| 2009/0109876 A1 | 4/2009 | Feng et al. |
| 2011/0013508 A1 | 1/2011 | Tuplur et al. |
| 2011/0038371 A1* | 2/2011 | Lin .................. H04L 49/45 370/389 |
| 2013/0148546 A1* | 6/2013 | Eisenhauer ......... H04L 41/0806 370/255 |

FOREIGN PATENT DOCUMENTS

| | | |
|---|---|---|
| CN | 102724099 A | 10/2012 |
| CN | 102821033 A | 12/2012 |
| CN | 103152260 A | 6/2013 |
| GB | 2482118 A | 1/2012 |
| WO | 2007131523 A1 | 11/2007 |

OTHER PUBLICATIONS

Supplementary European Search Report for corresponding Application EP13875436; dated Jan. 29, 2016; pp. 6.

* cited by examiner

SYSTEM, METHOD AND DEVICE FOR FORWARDING PACKET

TECHNICAL FIELD

The disclosure relates to the field of communications, including a system, method and device for forwarding a packet.

BACKGROUND

To meet the high-speed development of the Internet service and the mobile communications, an ultrahigh requirement is proposed on the capacity and the extensibility of the core router of the backbone network. For example, in the telecommunication process of the IP network, the ultra-high requirement is proposed on the aspects such as, the capacity, security and reliability, multi-service bearing capacity of a high-end core router. The core router of the backbone network need to be of an excellent extensibility and upgrading capability to adapt to the trends of change-ability and rapid development of the Internet. The network may be attacked to become paralyzed while bringing convenience to people. Because the TCP/IP for constructing the Internet lacks security, the network security becomes an actual problem having to be faced. The network may be attacked in various ways, including packet interception, IP address spoofing, source route attack, port scanning, Denial of Service (DoS) attack, application layer attack and the like; in addition, the reliability and the line security of the network are also an important problem.

A cluster-based router in the related arts has some problems: for example, all the packets in the cluster-based router are transmitted through a same channel, including a control message and a protocol packet. The control message is an internal control plane message of the cluster-based router and has a higher priority and a higher requirement on the transmission reliability than that of the protocol packet. With the wide application of the network, more protocol packets appear, and some attacked packets may enter into the network due to the existence of network attack. Therefore, the number of the protocol packets may increase sharply, and the bandwidth of the control plane message may be occupied when the traffic of the protocol packets increases; accordingly, the control plane message may be congested or discarded, and the running of the whole system may be affected once one control plane message is discarded. Sometimes, there may be many control plane messages in the cluster-based router, which may affect the transmission of the protocol packet. Therefore, the reliability and security of the cluster-based router may be reduced when the control message and the protocol packet are transmitted in the same channel.

SUMMARY

A system, a method and a device for forwarding a packet are provided, in order to at least solve the problem that the reliability and security of the cluster-based router may be reduced when a control message and a protocol packet are transmitted in a same channel in the related arts.

In one aspect, a system for forwarding a packet is provided, comprising: an LCC comprising a first LCC's control ether switch unit and a second LCC's control ether switch unit; a first CFC comprising a first CFC's control ether switch unit; and a second CFC comprising a second CFC's control ether switch unit, wherein a control message channel and a protocol packet channel are separately arranged between the first and the second LCC's control ether switch units and the first and the second CFC's control ether switch units.

In an example embodiment, separately arranging the control message channel and the protocol packet channel between the first and the second LCC's control ether switch units and the first and the second CFC's control ether switch units comprises: a link between the first LCC's control ether switch unit and the first CFC's control ether switch unit serving as a control message channel, and a link between the second LCC's control ether switch unit and the second CFC's control ether switch unit serving as a protocol packet channel; or, a link between the first LCC's control ether switch unit and the second CFC's control ether switch unit serving as a control message channel, and a link between the second LCC's control ether switch unit and the first CFC's control ether switch unit serving as a protocol packet channel.

In an example embodiment, the system further comprises: a local exchange unit, coupled with the first LCC's control ether switch unit and the second LCC's control ether switch unit, and configured to exchange a control message and a protocol packet with the first LCC's control ether switch unit and the second LCC's control ether switch unit respectively.

In an example embodiment, the system further comprises: a Central Processing Unit (CPU) with two network cards, wherein the CPU is coupled with the local exchange unit, one of the two network cards is configured to exchange a control message with the local exchange unit, and the other one of the two network cards is configured to exchange a protocol packet with the local exchange unit.

According to the other aspect of the disclosure, a method for forwarding a packet is provided, comprising: determining a control message channel and a protocol packet channel which are separately arranged between first and second LCC's control ether switch units in an LCC, and first and second CFC's control ether switch units respectively in first and second CFCs; and transmitting a control message and a protocol packet respectively according to the determined control message channel and the determined protocol packet channel.

In an example embodiment, determining the control message channel and the protocol packet channel which are separately arranged between the first and second LCC's control ether switch units in the LCC, and the first and second CFC's control ether switch units respectively in the first and second CFCs comprises: stacking the first LCC's control ether switch unit with the second LCC's control ether switch unit, and stacking the first CFC's control ether switch unit with the second CFC's control ether switch unit, wherein port information of ports for forming channels are synchronized between the stacked switch units; and determining the control message channel and the protocol packet channel by judging, via packet negotiations, whether the ports join a Link Aggregation Group (LAG).

In an example embodiment, before transmitting the control message and the protocol packet respectively according to the determined control message channel and the determined protocol packet channel, the method further comprises: allocating a load to each port belonging to the LAG for link aggregation between a local exchange unit and the first and second LCC's control ether switch units.

In an example embodiment, before transmitting the control message and the protocol packet respectively according to the determined control message channel and the determined protocol packet channel, the method further comprises: for a CPU with two network cards, configuring a number limit of received and/or sent packets of one network card for exchanging the control message with the local exchange unit to be higher than that of the other one network card for exchanging a protocol packet with the local exchange unit.

According to another aspect of the disclosure, a device for forwarding a packet is provided, comprising: a determining component, configured to determine a control message channel and a protocol packet channel which are separately arranged between first and second LCC's control ether switch units in an LCC and first and second CFC's control ether switch units respectively in first and second CFCs; and a transmitting component, configured to transmit a control message and a protocol packet respectively according to the determined control message channel and the determined protocol packet channel.

In an example embodiment, the determining component comprises: a stacking element, configured to stack the first LCC's control ether switch unit with the second LCC's control ether switch unit and the first CFC's control ether switch unit with the second CFC's control ether switch unit, wherein port information of ports for forming channels are synchronized between the stacked switch units; and a determining element, configured to determine the control message channel and the protocol packet channel by judging, via packet negotiations, whether the ports join a Link Aggregation Group (LAG).

In an example embodiment, the device further comprises: an allocating element, configured to allocate a load to each port belonging to the LAG for link aggregation between a local exchange unit and the first and second LCC's control ether switch units.

In an example embodiment, the device further comprises: a configuring component, configured to, for a CPU with two network cards, configure a number limit of received and/or sent packets of one network card for exchanging the control message with the local exchange unit to be higher than that of the other one network card for exchanging the protocol packet with the local exchange unit.

Through the disclosure, due to the adoption of the LCC including the first LCC's control ether switch unit and the second LCC's control ether switch unit, the first CFC including the first CFC's control ether switch unit, and the second CFC including the second CFC's control ether switch unit, wherein a control message channel and a protocol packet channel are separately arranged between the first and the second LCC's control ether switch units and the first and the second CFC's control ether switch units, the problem that the reliability and security of the cluster-based router may be reduced when the control message and the protocol packet are transmitted in the same channel in the related arts is solved, so as to achieve the effects of forwarding the control message and the protocol packet in a cluster-based router separately and enhancing the reliability and the security of the cluster-based router.

BRIEF DESCRIPTION OF THE DRAWINGS

The drawings illustrated here are to provide further understanding of the disclosure and constitute one part of the application, and the exemplary embodiments of the disclosure and the explanations thereof are intended to explain the disclosure, instead of improperly limiting the disclosure. In the drawings.

DETAILED DESCRIPTION OF THE EMBODIMENTS

The disclosure will be described below with reference to the drawings and in combination with the embodiments in detail. It should be noted that, in case of no conflict, the embodiments of the application and features therein can be combined with one another.

Figure 1:
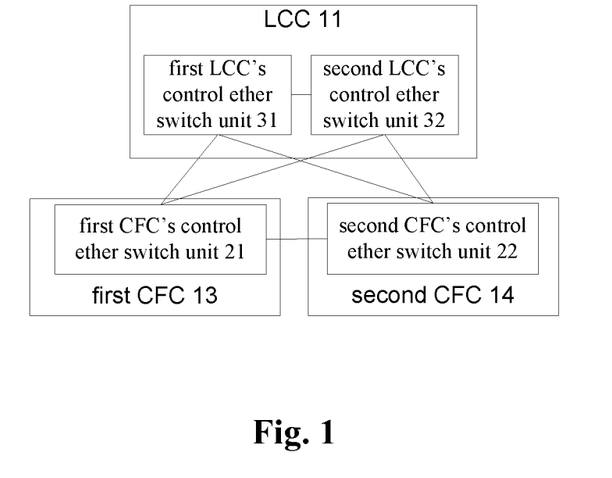
FIG. 1 is a block diagram showing a structure of a system for forwarding a packet according to an embodiment of the disclosure.

A system for forwarding a packet is provided in the embodiment of the disclosure, and FIG. 1 is a block diagram showing a structure of a system for forwarding a packet according to an embodiment of the disclosure. As shown in FIG. 1, the system includes: an LCC 11 including a first LCC's control ether switch unit 31 and a second LCC's control ether switch unit 32, a first CFC 13 including a first CFC's control ether switch unit 21, and a second CFC 14 including a second CFC's control ether switch unit 22, wherein a control message channel and a protocol packet channel are separately arranged between the first and the second LCC's control ether switch units 31, 32 and the first and the second CFC's control ether switch units 21, 22.

According to the control message channels and the protocol packet channels which are separated in a cluster-based router, a control message and a protocol packet can be forwarded separately, thus, in comparison with the way of transmitting the control message and the protocol packet in a same channel in the related arts, the mutual influence between the transmission of the control message and the transmission of the protocol packet is avoided effectively; moreover, two corresponding switch units are arranged in the LCC and the CFCs so as to be favourable for the implementation of inter-backup function, that is to say, the reliability and security of the cluster-based router are improved to a certain extent.

It should be noted that the control message channel and the protocol packet channel can be separately arranged between the first and the second LCC's control ether switch units and the first and the second CFC's control ether switch units in various ways. For example, the first example combination way is: the link between the first LCC's control ether switch unit and the first CFC's control ether switch unit is served as a control message channel, and the link between the second LCC's control ether switch unit and the second CFC's control ether switch unit is served as a protocol packet channel; or, the second example combination way is: the link between the first LCC's control ether switch unit and the second CFC's control ether switch unit is served as a control message channel, and the link between the second LCC's control ether switch unit and the first CFC's control ether switch unit is served as a protocol packet channel.

Figure 2:
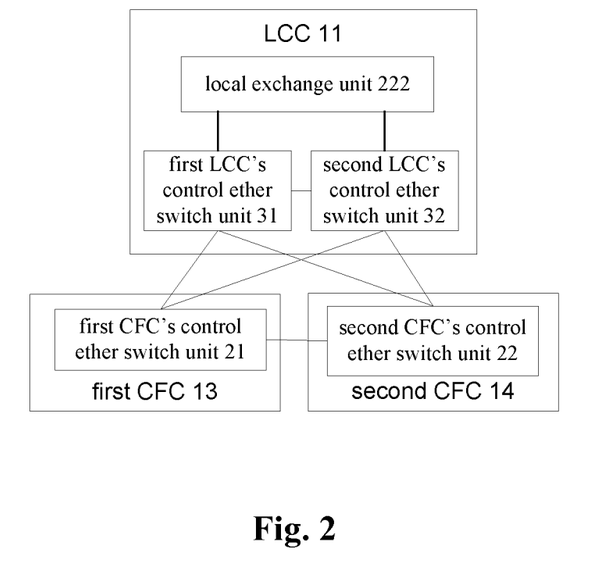
FIG. 2 is a first block diagram showing an example structure of the system for forwarding the packet according to an embodiment of the disclosure.

FIG. 2 is a first block diagram showing an example structure of the system for forwarding the packet according to an embodiment of the disclosure. As shown in FIG. 2, besides all the structures in FIG. 1, the system further includes a local exchange unit 222, and the local exchange unit 222 is described below.

The local exchange unit 222 is coupled with the first LCC's control ether switch unit 31 and the second LCC's control ether switch unit 32 and is configured to exchange a control message and a protocol packet with the first LCC's control ether switch unit and the second LCC's control ether switch unit respectively. It should be noted that, in the system for separating the control message channel and the protocol packet channel, the link between the local exchange unit and the first and the second LCC's control ether switch units in the LCC can also be not separated but is processed separately, and in comparison with non-separation, this way not only can enable the control message channel and the protocol packet channel to be separated but also implement the benefits of avoiding the link redundancy and improving the bandwidth.

Figure 3:
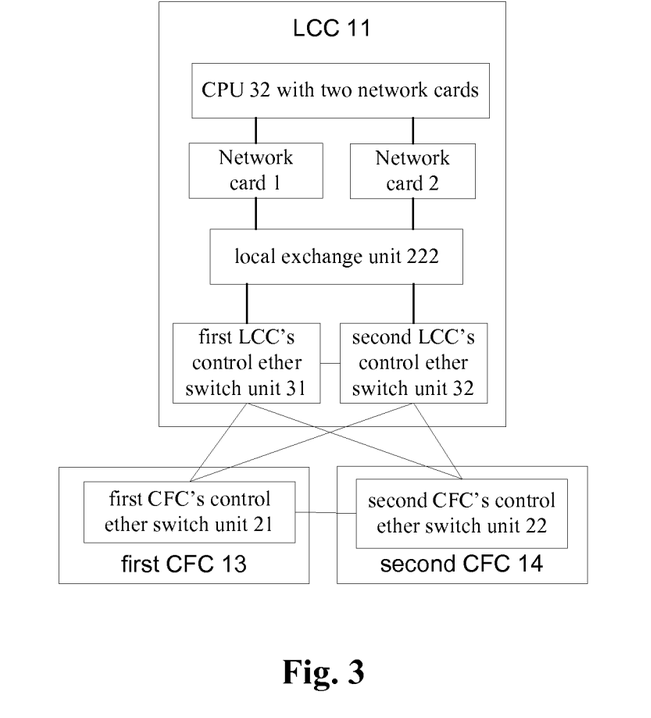
FIG. 3 is a second block diagram showing an example structure of the system for forwarding the packet according to an embodiment of the disclosure.

FIG. 3 is a second block diagram showing an example structure of the system for forwarding the packet according to an embodiment of the disclosure. As shown in FIG. 3, besides all the structures in FIG. 2, the system further includes a CPU 32 with two network cards, and the CPU is described below.

The CPU 32 with two network cards is coupled with the local exchange unit, wherein one network card 1 is configured to exchange a control message with the local exchange unit, and the other network card 2 is configured to exchange a protocol packet with the local exchange unit. Thus, not only the effect of separating the control message channel and the protocol packet channel is achieved, but also a basis is laid for the configuration of the control message channel and the protocol packet channel. For example, for the control message channel and the protocol packet channel which are separate, the number limit of the network card for receiving and transmitting the control message can be set to be higher than that of the network card for receiving and transmitting the protocol packet, thus, the reliability for receiving and transmitting the control messages can be protected to a certain extent.

Figure 4:
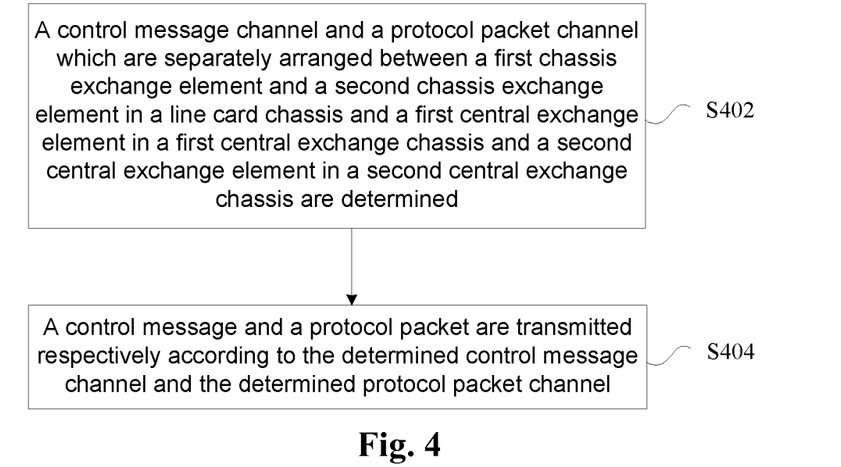
FIG. 4 is a flowchart of a method for forwarding a packet according to an embodiment of the disclosure.

A method for forwarding a packet is provided in the embodiment of the disclosure. FIG. 4 is a flowchart of a method for forwarding a packet according to an embodiment of the disclosure. As shown in FIG. 4, the flow includes the following steps:

Step 402: A control message channel and a protocol packet channel which are separately arranged between first and second LCC's control ether switch units in an LCC and a first and second CFC's control ether switch units respectively in first and second CFCs are determined.

Step 404: A control message and a protocol packet are transmitted respectively according to the determined control message channel and the determined protocol packet channel.

Through the step, the control message channel for transmitting the control message and the protocol packet channel for transmitting the protocol packet are separated, in comparison with the way of transmitting the control message and the protocol packet in a same channel in the related arts, not only the mutual influence between the transmission of the control message and the transmission of the protocol packet is avoided effectively but also the reliability and security of the cluster-based router are improved to a certain extent.

The control message channel and the protocol packet channel which are mutually separated can be determined in various ways. For example, in the LCC including the first LCC's control ether switch unit and the second LCC's control ether switch unit, the first CFC including the first CFC's control ether switch unit, and the second CFC including the second CFC's control ether switch unit, the control message channel and the protocol packet channel which are separately arranged between the first and the second LCC's control ether switch units in the LCC and the first and the second CFC's control ether switch units respectively in the first and the second CFCs can be determined in the following ways: the first LCC's control ether switch unit and the second LCC's control ether switch unit are stacked, and the first CFC's control ether switch unit and the second CFC's control ether switch unit are stacked, wherein the port information of ports for forming the channels are synchronized between the stacked switch units, namely, the two stacked switch units can timely acquire the status information of the port of the opposite-end switch unit, thus the ports for forming the control message channel and the protocol packet channel are in an aggregation group; then, the control message channel and the protocol packet channel are determined by judging, via packet negotiation, whether the ports join the link aggregation group; in the determining process, a corresponding switch unit can be distinguished by the corresponding chassis number (the serial number of each CFC's control ether switch unit) and the corresponding slot number (the serial number of each LCC's control ether switch unit) of the corresponding switch unit carried in the packet, and whether the port coupled with the switch unit is joined the aggregation group is determined according to the serial number specified in the packet, and the ports not to be joined to the aggregation group are not used for forwarding the control message and the protocol packet, so that the links not for forwarding the control message and the protocol packet are removed, and it is determined that the links between the ports joining the aggregation group are the control message channel for transmitting the control message and the protocol packet channel for transmitting the protocol packet.

To enable the resources for transmitting packets to be reasonable, before the control message and the protocol packet are transmitted according to the determined control message channel and the protocol packet channel, loads are allocated to each port belonging to the LAG for link aggregation between the local exchange unit and the first and the second LCC's control ether switch units; when a packet passes through the aggregation link, which port in the aggregation group the packet is transmitted from is determined according to a load sharing principle; and there may be various load sharing principles: for example, it can be determined according to a source Media Access Control (MAC) address; source and destination MAC addresses plus the address of a Virtual Local Area Network (VLAN); and source and destination IP addresses.

In order to control the bandwidth resources of the control message channel for transmitting the control message and the protocol packet channel for transmitting the protocol packet more effectively, the transmission bandwidth of the control message channel and the protocol packet channel can be configured before the control message and the protocol packet are transmitted according to the determined control message channel and the determined protocol packet channel. For example, in order to ensure the reliability of the control message channel to a certain extent, for a CPU with two network cards, the number limit of received and/or sent packets of one network card for exchanging the control message with the local exchange unit can be configured to be higher than that of the other one network card for exchanging the protocol packet with the local exchange unit; thus, the internal reliability of the router is improved.

A device for forwarding a packet is provided in the embodiment of the disclosure, and the device is configured to implement the embodiments and the example embodiments above, thereby needing no further description. As below, the term "component" can implement the combination of software and/or hardware of predetermined functions. Although the device described in the following embodiments is preferably implemented by software, the implementation of hardware or the combination of the software and hardware can also be composed.

Figure 5:
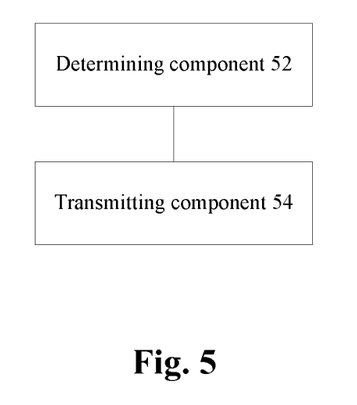
FIG. 5 is a block diagram showing a structure of a device for forwarding a packet according to an embodiment of the disclosure.

FIG. 5 is a block diagram showing a structure of a device for forwarding a packet according to an embodiment of the disclosure; as shown in FIG. 5, the device includes: a determining component 52 and a transmitting component 54, and the device is described below.

The determining component 52 is configured to determine a control message channel and a protocol packet channel which are separately arranged between first and second LCC's control ether switch units in an LCC and first and second CFC's control ether switch units respectively in first and second CFCs, and the transmitting component 54 is coupled with the determining component 52 and is configured to transmit a control message and a protocol packet respectively according to the determined control message channel and the determined protocol packet channel.

Figure 6:
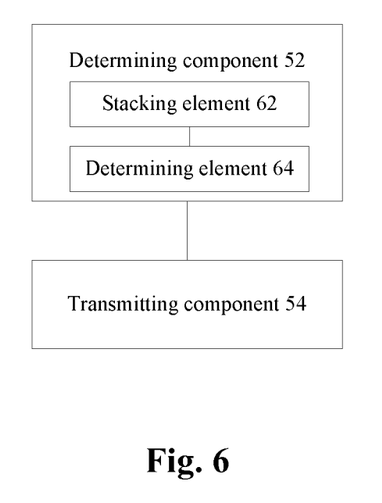
FIG. 6 is a first block diagram showing an example structure of the determining component 52 in the device for forwarding the packet according to an embodiment of the disclosure.

FIG. 6 is a first block diagram showing an example structure of the determining component 52 in the device for forwarding the packet according to an embodiment of the disclosure. As shown in FIG. 6, the acquiring module 52 includes a stacking element 62 and a determining element 64 and is specifically described below.

The stacking element 62 is configured to stack the first LCC's control ether switch unit with the second LCC's control ether switch unit and the first CFC's control ether switch unit with the second CFC's control ether switch unit, wherein the port information of ports for forming the channels are synchronized between the stacked switch units, and the determining element 64 is coupled with the stacking element 62 and is configured to determine the control message channel and the protocol packet channel by judging, via packet negotiations, whether the ports join an LAP.

Figure 7:
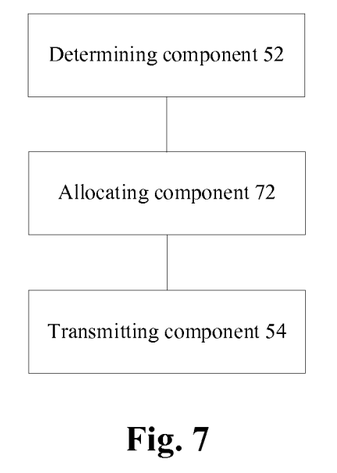
FIG. 7 is a first block diagram showing an example structure of the device for forwarding the packet according to an embodiment of the disclosure.

FIG. 7 is a first block diagram showing an example structure of the device for forwarding the packet according to an embodiment of the disclosure. As shown in FIG. 7, besides all the components in FIG. 5, the example structure further includes an allocating module 72 which is described below.

The allocating module 72 is coupled with the determining component 52 and the transmitting component 54 and is configured to allocate a load to each port belonging to the LAG for link aggregation between the local exchange unit and the first and the second LCC's control ether switch units.

Figure 8:
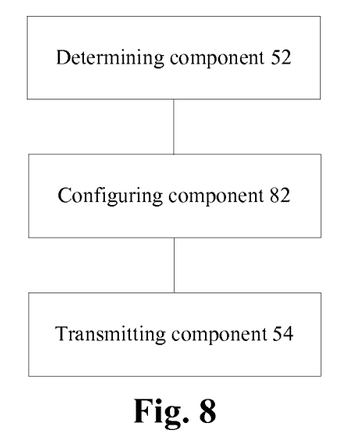
FIG. 8 is a second block diagram showing an example structure of the device for forwarding the packet according to an embodiment of the disclosure.

FIG. 8 is a second block diagram showing an example structure of the device for forwarding the packet according to an embodiment of the disclosure. As shown in FIG. 8, besides all the components in FIG. 5, the example structure further includes a configuring component 82 which is described below.

The configuring component 82 is coupled with the determining component 52 and the transmitting component 54 and is configured to, for a CPU with two network cards, configure the number limit of received and/or sent packets of one network card for exchanging the control message with the local exchange unit to be higher than that of the other one network card for exchanging the protocol packet with the local exchange unit.

In the embodiments and the example embodiments of the disclosure, based on the internal control plane security technology in a cluster-based router, a system for improving the reliability and security of the cluster-based router is provided. The system includes a packet transmitting model in which a control message channel and a protocol packet channel are separated and the implementing method of the packet transmitting model. When the cluster-based router suffers from an external attack or there are many protocol packets, the reliable transmission and processing of the internal control message are ensured.

A system in which the control message channel and the protocol packet channel are separated includes: at least two CFCs, at least two CFC's control ether switch units, at least one LCC, at least two LCC's control ether switch units, at least two local exchange units, at least two CPUs with two network cards, and at least one interface card.

The CFCs play the role to connect between the LCCs, the CFC's control ether switch units are in the CFCs, and each LCC is connected to the CFC's control ether switch units. The CFCs and the LCC both include the LCC's control ether switch units, the local exchange units and the CPUs, and each LCC at least includes two LCC's control ether switch units. The LCC's control ether switch unit of the LCC is connected to the CFC's control ether switch unit and the local exchange unit of the LCC, and the local exchange unit is connected to the LCC's control ether switch unit and CPU of the LCC. The LCC's control ether switch unit of the CFC is connected to the CFC's control ether switch unit and the local exchange units of the CFC, and the local exchange unit is connected to the LCC's control ether switch unit and CPU of the CFC.

The CFC is the chassis where the CFC's control ether switch unit locates, and there is at least one CFC's control ether switch unit and at least two LCC's control ether switch units and a plurality of local exchange units and CPUs in the CFC.

The CFC's control ether switch units are mainly responsible for the exchange between the LCC's control ether switch units, and the CFC's control ether switch units are necessary for the exchange between the LCC's control ether switch unit of one chassis and the LCC's control ether switch unit of another chassis. The links between the CFC's control ether switch units and the LCC's control ether switch units are subjected to link aggregation through an LACP.

The CFC's control ether switch units are stacked to act as one switch unit from the view of the LCC's control ether switch units. Due to the two CFC's control ether switch units, mutual backup can be implemented and the reliability can be improved, moreover, the control message channel and the protocol packet channel can be separated, one CFC's control ether switch unit exchanges a protocol packet and the other CFC's control ether switch unit exchanges a control message.

The LCC includes an LCC's control ether switch unit, a local exchange unit and a CPU for processing a packet.

The LCC's control ether switch unit is of two functions, one function is to connect an LCC to the CFC so that the LCC can communicate with other chassises. The other function is to implement the interconnection between the local exchange units of the LCC, so that the local exchange units in the LCC can communicate with each other and can also communicate with other chassises. The LCC's control ether switch units can also be stacked so as to be shown as one switch unit.

The local exchange unit is mainly responsible for exchanging a protocol packet and a control message of a local CPU to the CFC's control ether switch units and receiving the protocol packet and the control message from the LCC's control ether switch units. The local exchange unit is coupled with the two LCC's control ether switch units by links, in one aspect, link redundancy is implemented and the bandwidth is improved; in another aspect, the control message channel and the protocol packet channel can be separated. The ports coupled with the LCC's control ether switch units are subjected to link aggregation through an LACP, and the link aggregation allows one or more links to be aggregated together to form a link aggregation group. When a packet is transmitted through the aggregation group, from which port in the aggregation group the packet is transmitted is determined according to a load sharing principle, and generally, there are many load sharing principles, for example, it is determined according to a source MAC address and a destination MAC address, a source MAC address and a destination MAC address plus an VLAN, a source IP and a destination IP and the like.

The CPU includes two network cards, wherein one network card is responsible for receiving and transmitting the protocol packet, and the other network card is responsible for receiving and transmitting the control message, so that the effect of separating the control message channel and the protocol packet channel is achieved. When the number of received and/or sent packets of the network card for receiving and the transmitting the control message is configured to be higher than that of the network card for receiving and the transmitting the protocol packet in the CPU, it is ensured that the control message can be preferably received and processed by the CPU, and the internal reliability of the router is improved. The MAC address of each CPU network card needs to be allocated rationally so that the protocol packet and the control message can be sent out from different ports during the load sharing of the aggregation group.

The interface card is mainly coupled with an external network to receive a packet from the external network; if it is detected that the packet is the protocol packet and needs to be processed by the router, the packet may be forwarded to the internal CPU of the router. When the internal CPU of the router needs to forward the packet to other routers, the packet also needs to be forwarded through the interface card.

The process for separating the control message channel and the protocol packet channel provided in the embodiment of the disclosure includes the following: (1) Two CFC's control ether switch units are stacked. (2) Whether the links between the CFC's control ether switch units and the LCC's control ether switch units are joined to the aggregation group is determined. (3) A load sharing rule is set for the CFC's control ether switch units, specifically, one CFC's control ether switch unit is set to exchange the protocol packet and the other is set to exchange the control message. (4) The MAC address of the network card is set. (5) The port is joined to the link aggregation through the negotiation of an LACP packet, and is set to a port for transmitting the protocol packet or a port for transmitting the control message.

A system for separating a control message channel and a protocol packet channel in the example embodiment of the disclosure is described below in combination with the drawings.

Figure 9:
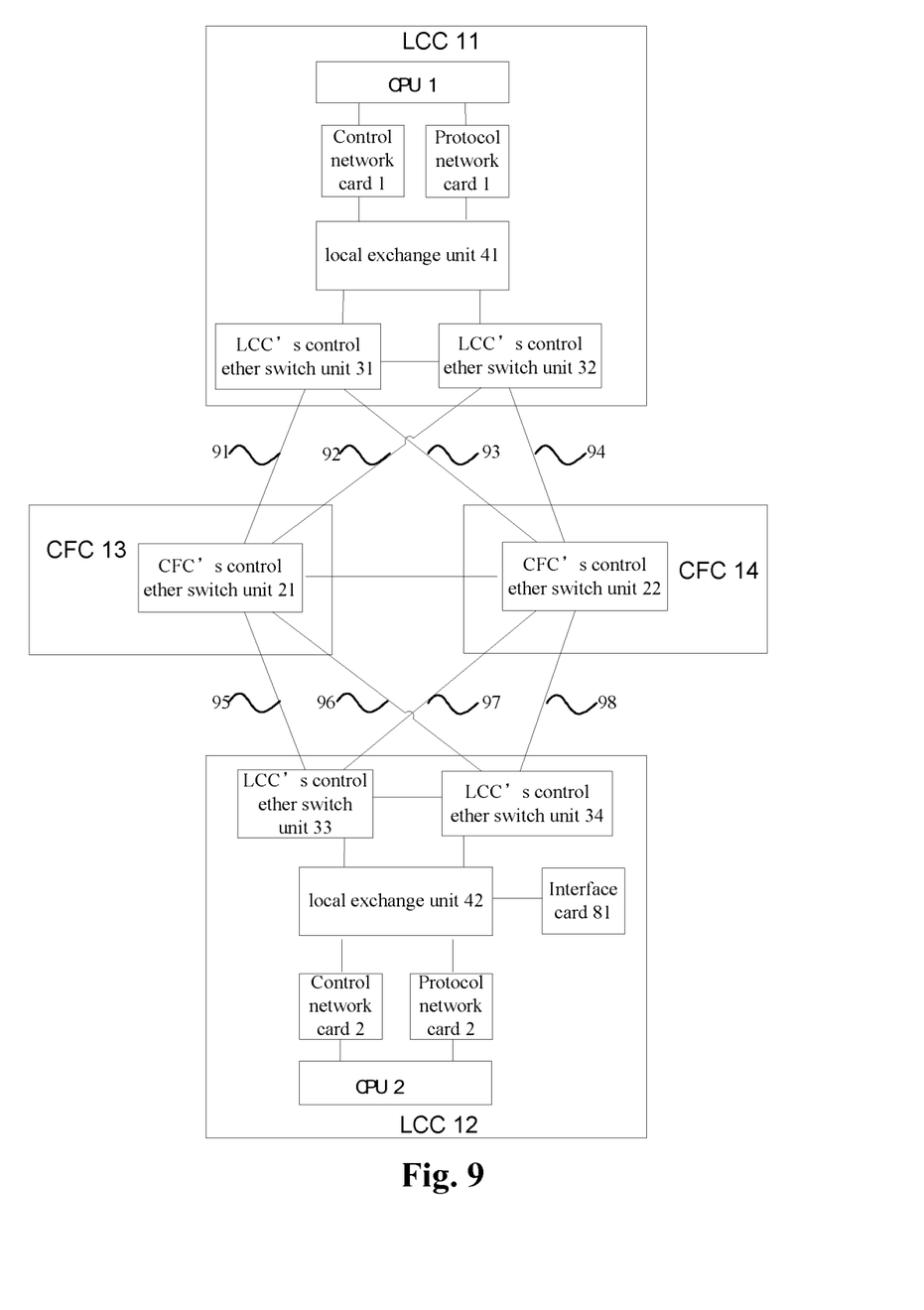
FIG. 9 is a diagram showing a structure of a system for separating a control message channel and a protocol packet channel according to an example embodiment of the disclosure.

FIG. 9 is a diagram showing a structure of a system for separating a control message channel and a protocol packet channel according to an example embodiment of the disclosure. As shown in FIG. 9, the system includes:

two CFCs and two LCCs. Each chassis is identified by a chassis serial number, and the serial numbers of the LCCs and the CFCs can be continuous or separate. Now, the serial number of the upper LCC is labelled as number 1, the serial number of the lower LCC is labelled as number 2, the serial number of the left CFC is labelled as number 3 and the serial number of the right CFC is labelled as number 4. The LCC's control ether switch unit in each chassis is provided with a number which is a slot number, the slot number of the left chassis is smaller than the slot number of the right chassis, and these numbers are not fixed and are only intended for the later description. It should be noted that the CFC can include an LCC's control ether switch unit, a local exchange unit and a CPU, and the LCC 11 can include an interface card. In addition, the separation of packet channels referred in the embodiment and the example embodiment of the disclosure can be between two LCCs or between an LCC and a central chassis. In order to describe the principle of the composition and structure and the method more clearly, a simplification is made in FIG. 9, for example, the LCC's control ether switch unit 31 or the LCC's control ether switch unit 33 in FIG. 9 is equivalent to the first LCC's control ether switch unit 31; the LCC's control ether switch unit 32 or the LCC's control ether switch unit 34 in FIG. 9 is equivalent to the second LCC's control ether switch unit 32; the CFC 13 in FIG. 9 is equivalent to the first CFC 13 above; the CFC 14 in FIG. 9 is equivalent to the second CFC 14 above; the CFC's control ether switch unit 21 in FIG. 9 is equivalent to the first CFC's control ether switch unit 21 above; the CFC's control ether switch unit 22 in FIG. 9 is equivalent to the second CFC's control ether switch unit 22 above; the local exchange unit 41 and the local exchange unit 42 in FIG. 9 are equivalent to the local exchange unit 222 above; the control network card 1 or the control network card 2 is equivalent to the network card 1, the protocol network card 1 or the protocol network card 2 is equivalent to the network card 2; and CPU1 and CPU 2 are equivalent to the CPU 32 with two network cards.

The CPU is coupled with two LCC's control ether switch units of the chassis, and the LCC's control ether switch unit of each LCC is coupled with two CFC's control ether switch units, thus, each LCC's control ether switch unit can forward a packet to any CFC's control ether switch unit, but the external protocol packet of the router and the internal control message channel of the router cannot be separated and may pass through a same CFC's control ether switch unit or a same LCC's control ether switch unit.

To separate the protocol packet channel from the control message channel, two CFC's control ether switch units need to be stacked, and the LCC's control ether switch units in each chassis also need to be stacked. The stacked switch units need to synchronize stacked information by a regular synchronization way and a variable synchronization way. The ports of the stacked switch units are maintained by the two synchronization ways, that is to say, the opposite-end port is added to the aggregation group of this switch unit or is deleted from the aggregation group, and the information of the ports between the stacked switch units and the information of the aggregation group are consistent. The port of each switch unit is added to or deleted from the aggregation group through the LACP, and the port information refers to the information that the port is added to or is deleted from the aggregation group and the serial number of the aggregation group corresponding to the port.

In one aspect, the port information needs to be synchronized to the other switch unit on time, and the other switch unit receives the synchronized port information and then compares the synchronized port information with the port information saved previously and updates the port information. In another aspect, the port information is synchronized to the other switch unit in a variable way; when the port status of this switch unit changes, this end need to add the port to the aggregation group or deletes the port from the aggregation group; moreover, a notification message needs to be sent to the other switch unit at once; after the opposite end receives the change of the status information of the port, the port is added to or is deleted from the aggregation group corresponding to the port. The stacked switch units need to store a global table of the ports of the opposite end, wherein the ports of the opposite end has been added to the aggregation group, and the content of the global table includes: aggregation group number of the port, port number, the chip number of equipment to which the port belongs, and the chip number of the equipment, i.e., the serial numbers of the stacked switch units, used for distinguishing the stacked switch units. After the message which is used for synchronizing information in a variable way or a regular way from the opposite end is received, the information in the message is compared with the information in the global table, and the information in the global table is updated so as to keep the information of this end to be synchronous with the opposite end. The regular synchronization ensures the consistence of the content in the global table, and the variable synchronization ensures the real-time performance of the content in the global table. The regular synchronization mainly overcomes the defect of failure of the variable synchronization, and if the variable synchronization is failed, the information of the two ends can also be ensured to be consistent by regular synchronization within a certain period.

The two CFC's control ether switch units and the LCC's control ether switch unit in each chassis are stacked completely, and the ports of the LCC's control ether switch units of each LCC and the ports of the CFC's control ether switch units are in an aggregation group; when it is stipulated that the LCC's control ether switch unit 31 and the CFC's control ether switch unit 21 only forward the control message, and the LCC's control ether switch unit 32 and the CFC's control ether switch unit 22 only forward the protocol packet, the control message of the LCC's control ether switch unit 31 may also be forwarded to the CFC's control ether switch unit 22, so that the channels cannot be separated. To enable the LCC's control ether switch unit forwarding the protocol packet to forward only the protocol packet to the CFC's control ether switch unit only forwarding the protocol packet, and to enable the LCC's control ether switch unit forwarding the control message to forward only the control message to the CFC's control ether switch unit only forwarding the control message, it is necessary to set links between the CFC's control ether switch units and the LCC's control ether switch units to enable the crossed links not to forward any packet temporarily, wherein the crossed links include the link between the LCC's control ether switch unit forwarding the protocol packet and the CFC's control ether switch unit forwarding the control message, and include the link between the LCC's control ether switch unit forwarding the control message and the CFC's control ether switch unit forwarding the protocol packet; but the crossed links is not allowed to forward the packet forever, for example, when a directly-connected link is failed, the crossed links may prepare for forwarding the packet within one hundred and fifty milliseconds. To achieve the effects, the following steps need to be completed according to the following principle.

Firstly, when the ports of the CFC's control ether switch units send an LACP packet, the two bytes in the source MAC of the packet are the chassis number and slot number of each CFC's control ether switch unit respectively, and the two CFC's control ether switch units are different at least in term of one of the chassis number and the slot number, thus, the two CFC's control ether switch units can be distinguished according to the two items.

After the ports of the LCC's control ether switch units receive the LACP packet from the CFC's control ether switch units, the chassis numbers and slot numbers of the CFC's control ether switch units are parsed from the source MAC of the LACP packet to check whether the packets from the two CFC's control ether switch units are received, if the packet from only one of the CFC's control ether switch units is received, the port joins to the aggregation group normally through the negotiation of the LACP packet.

If the LCC's control ether switch units receive the LACP packets from the two CFC's control ether switch units, the chassis numbers of the CFCs are compared, and if the two CFC's control ether switch units are inserted in one chassis, their slot numbers are compared. When the LCC's control ether switch unit is the left LCC's control ether switch unit, the port coupled with the CFC's control ether switch unit with a small chassis number is normally added to the aggregation group through the negotiation of the LACP packet; the port coupled with the CFC's control ether switch unit with a larger chassis number is only negotiated by the LACP packet but is not added to the aggregation group after the negotiation is successful, and the port is in a BLOCK status not forwarding the packet and the status of the port may depend on a tag which shows whether the port is added to the aggregation group and is added in the reserved field of an LACP packet transmitted to the CFC's control ether switch unit with a larger chassis number; and then, the tag is set to one showing that the port is not added to the aggregation group to be sent out, and the location of the tag in the LACP packet is an aggregation-flag field. After the CFC's control ether switch units receive the tag, the port of this end is not added to the aggregation group and is set to be in a BLOCK status.

Thus, when the LCC's control ether switch unit is the right LCC's control ether switch unit, the port coupled with the CFC's control ether switch unit with a larger chassis number is normally added to the aggregation group through the negotiation of the LACP packet; the port coupled with the CFC's control ether switch unit with a small chassis number is only negotiated by the LACP packet but is not added to the aggregation group after the negotiation is successful, and the port is in a BLOCK status, and the tag showing whether the port is added to the aggregation group in the LACP packet is set to one showing that the port is not added to the aggregation group.

Figure 10:
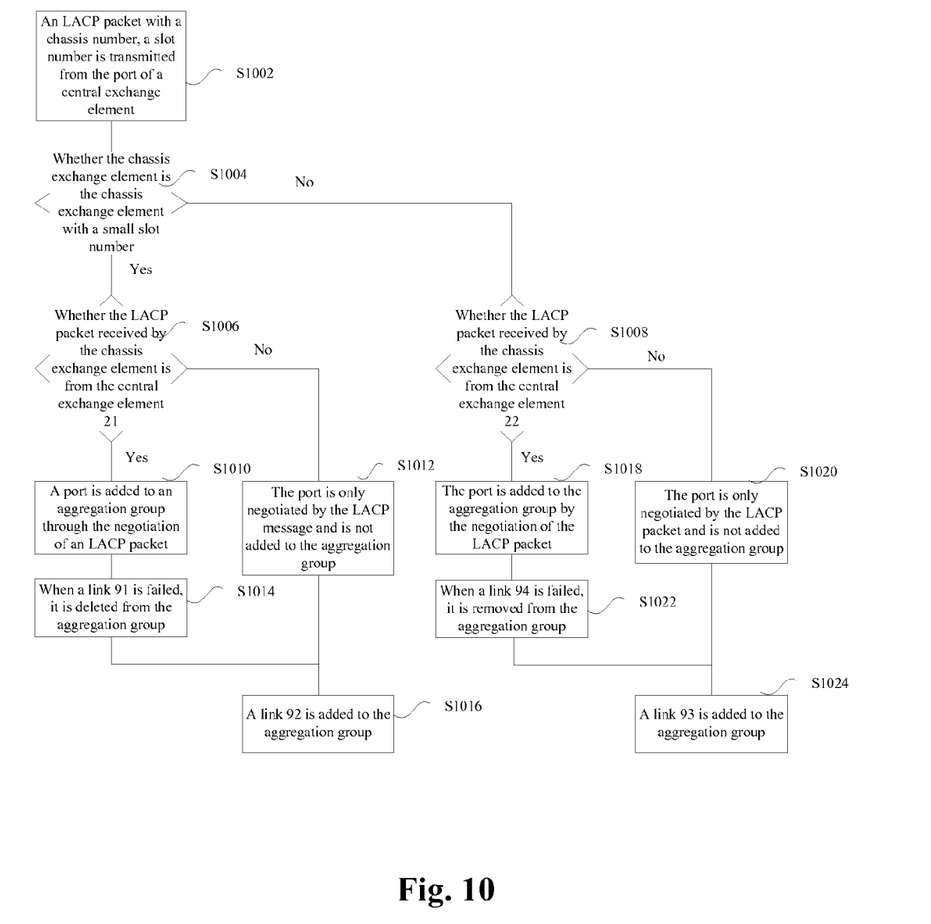
FIG. 10 is a flowchart of a packet forwarding process according to an embodiment of the disclosure.

In combination with the structure shown in FIG. 9, an example embodiment of the disclosure provides a method for forwarding a packet. FIG. 10 is a flowchart of a packet forwarding process according to an embodiment of the disclosure. As shown in FIG. 10, the flow includes the following steps:

Step 1002: A port of a CFC's control ether switch unit sends an LACP packet with a chassis number and a slot number, and then Step 1004 is executed.

Step 1004: Whether the LCC's control ether switch unit is the LCC's control ether switch unit with a small slot number is judged, if so, Step 1006 is executed, otherwise, Step 1008 is executed.

Step 1006: Whether the LACP packet received by the LCC's control ether switch unit belongs to the CFC's control ether switch unit 21, if so, Step 1010 is executed, otherwise, Step 1012 is executed.

Step 1008: Whether the LACP packet received by the LCC's control ether switch unit belongs to the CFC's control ether switch unit 22, if so, Step 1018 is executed, otherwise, Step 1020 is executed.

Step 1010: The port is added to the aggregation group by the negotiation of the LACP packet, and Step 1014 is executed.

Step 1012: The port is only negotiated by the LACP packet and is not added to the aggregation group, Step 1016 is executed.

Step 1014: A link 91 is failed and is deleted from the aggregation group, and Step 1016 is executed.

Step 1016: A link 92 is added to the aggregation group.

Step 1018: The port is added to the aggregation group by the negotiation of the LACP packet, and Step 1022 is executed.

Step 1020: The port is only negotiated by the LACP packet and is not added to the aggregation group, Step 1024 is executed;

Step 1022: The link 94 is failed and is deleted from the aggregation group, and Step 1024 is executed.

Step 1024: A link 93 is added to the aggregation group.

Figure 11:
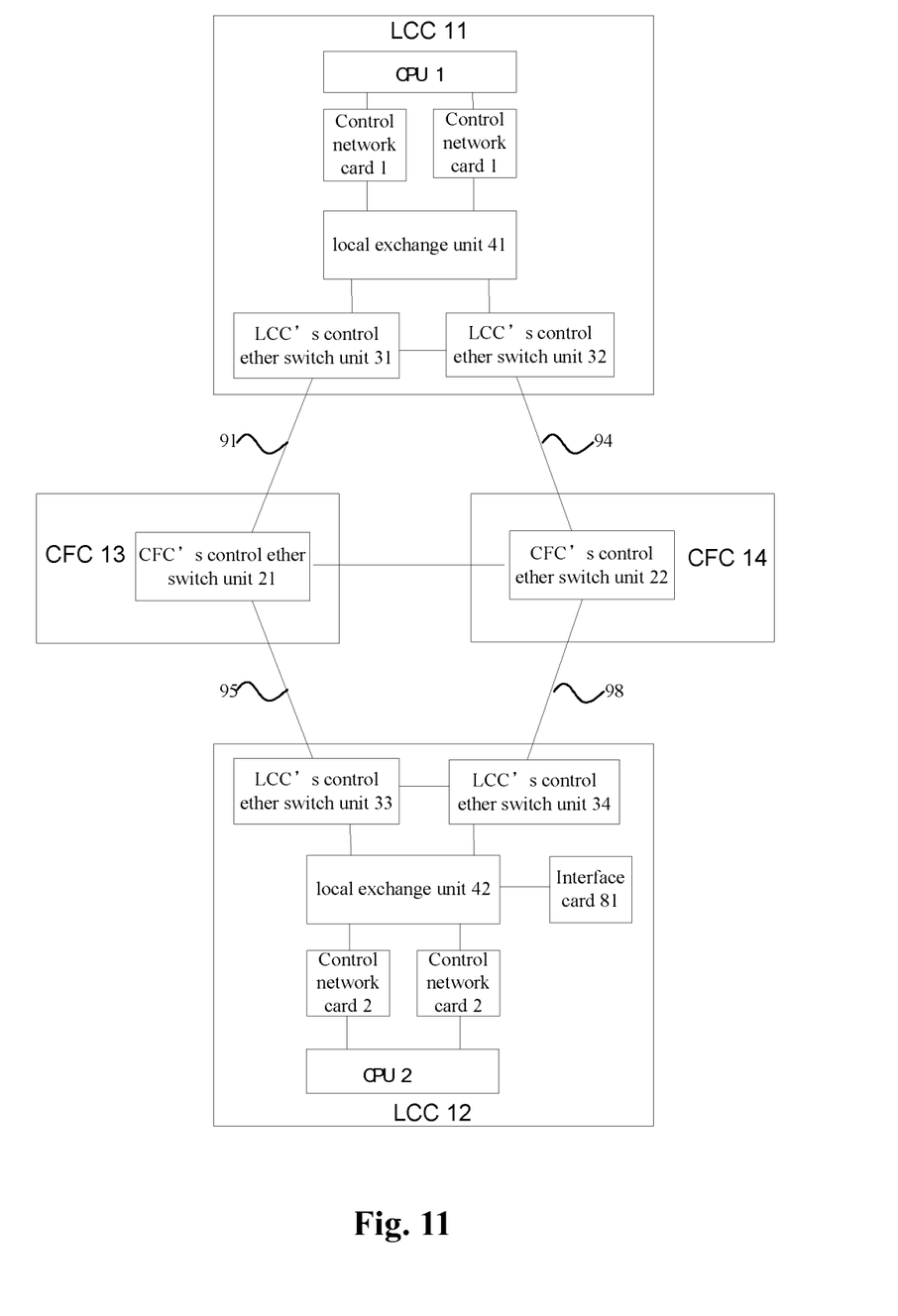
FIG. 11 is a diagram showing a structure for separating the channels of a control message and a protocol packet after the link not forwarding any packet is removed according to an embodiment of the disclosure.

After the links not forwarding any packet are removed by the method, FIG. 11 is a diagram showing a structure for separating the channels of a control message and a protocol packet after the link not forwarding any packet is removed according to an embodiment of the disclosure. As shown in FIG. 11, the connecting relationship of each switch unit of the whole system is: there are two separate channels on the communication of the CPUs and the interface cards between the LCC 11 and the LCC12 physically, so as to lay a solid foundation for the channel separation of the control message and the protocol packet.

It should be noted that, for the crossed links between the LCC's control ether switch units and the CFC's control ether switch units, i.e., the links which are successfully negotiated by the LACP but are not added to the aggregation group temporarily. However, the crossed links is not allowed to join the aggregation group forever, for example, when the link between the LCC's control ether switch unit 31 with a small slot number and a CFC's control ether switch unit 21 with a small chassis number is failed and cannot implement normal communication, the communication of the link between the LCC's control ether switch unit 31 and the CFC's control ether switch unit 21 may switch to the link between the LCC's control ether switch unit 31 and the CFC's control ether switch unit 22 within one hundred and fifty milliseconds, and the link may be added to the aggregation group. After the communication of the link 91 goes back to normal, the link 92 is deleted from the aggregation group again and cannot forward the control message and the protocol packet.

Two physically-separated channels have been formed, and it is necessary to set the MAC addresses of the network cards and the interface cards and a load sharing rule for the CFC's control ether switch units, the LCC's control ether switch units and the local exchange units so that the protocol packet and the control message are transmitted in two separate channels. The steps are as follows:

The bottom three bits of the MAC address of the protocol network interface of the CPU and the bottom three bits of the MAC address of the interface card are 100. For example, if the MAC address is in a form of BYTE0: BYTE1: BYTE2: BYTE3: BYTE4: BYTE5, the bottom three bits of the byte BYTE5 are 100.

The bottom three bits of the MAC address of the control surface network interface of the CPU are set to be 000.

The CFC's control ether switch unit with a small chassis number and the LCC's control ether switch unit with a small slot number are set to forward the control message, that is to say, these switch units only forward the packets in which the bottom three bits of the source MAC are 000.

The CFC's control ether switch unit with a large chassis number and the LCC's control ether switch unit with a large slot number are set to forward the protocol packet, that is to say, these switch units only forward the packets in which the bottom three bits of the source MAC are 100.

The port of the local exchange unit coupled with the LCC's control ether switch unit with a small slot number is set to only forward the control message, namely, when a packet needs to be forwarded from the local exchange unit to the LCC's control ether switch unit, if the bottom three bits of the source MAC of the packet is 000, the packet is forwarded from the port.

The port of the local exchange unit coupled with the LCC's control ether switch unit with a large slot number is set to only forward the protocol packet, namely, when a packet needs to be forwarded from the local exchange unit to the LCC's control ether switch units, if the bottom three bits of the source MAC of the packet is 100, the packet is forwarded from the port.

If a CFC's control ether switch unit is failed, all the packets are forwarded from the other CFC's control ether switch unit. Similarly, when an LCC's control ether switch unit in a chassis is failed, the other LCC's control ether switch unit may forward all the packets. In addition, when a port of the local exchange unit is failed, the other port may forward and receive all the packets.

To sum up, after all the settings are completed, as shown in FIG. 11, the channel for the control message is: an LCC's control ether switch unit 31—a CFC's control ether switch unit 21—an LCC's control ether switch unit 33; and the channel for the protocol packet is: an LCC's control ether switch unit 32—a CFC's control ether switch unit 22—an LCC's control ether switch unit 34. Here, one of the divided channels is for transmitting the control message and the other one is for transmitting the protocol packet, which is not fixed, or, as shown in FIG. 11, the left channel for transmitting the control message is configured to forward the protocol packet and the other one is configured to forward the control message.

Obviously, those skilled in the art shall understand that the components or steps of the disclosure may be implemented by general computing apparatus and centralized in a single computing apparatus or distributed in a network consisting of multiple computing apparatus. Optionally, the components or steps may be implemented by program codes executable by the computing apparatus, so that they may be stored in a storage apparatus and executed by the computing apparatus, and, in some cases, the steps can be executed in a sequence different from the illustrated or described sequence, or they are respectively made into the integrated circuit components or many of them are made into a single integrated circuit component. By doing so, the disclosure is not limited to any specific combination of hardware and software.

The above are only the preferred embodiments of the disclosure and not intended to limit the disclosure. For those skilled in the art, various modifications and changes can be made in the disclosure. Any modifications, equivalent replacements, improvements and the like within the spirit and principle of the disclosure shall fall within the scope of protection of the disclosure.

What is claimed is:

1. A system for forwarding a packet, comprising:
   a Line Card Chassis (LCC) comprising a first LCC's control ether switch unit and a second LCC's control ether switch unit;
   a first Central Fabric Chassis (CFC) comprising a first CFC's control ether switch unit; and
   a second CFC comprising a second CFC's control ether switch unit, wherein
   a control message channel and a protocol packet channel are separately arranged between the first and the second LCC's control ether switch units and the first and the second CFC's control ether switch units;
   wherein the system further comprises: a local exchange unit, coupled with the first LCC's control ether switch unit and the second LCC's control ether switch unit, and configured to exchange a control message and a protocol packet with the first LCC's control ether switch unit and the second LCC's control ether switch unit respectively;
   wherein each port belonging to a Link Aggregation Group (LAG) for link aggregation between the local exchange unit and the first and second LCC's control ether switch units is allocated a load.

2. The system according to claim 1, wherein separately arranging the control message channel and the protocol packet channel between the first and the second LCC's control ether switch units and the first and the second CFC's control ether switch units comprises:
   a link between the first LCC's control ether switch unit and the first CFC's control ether switch unit serving as the control message channel, and a link between the second LCC's control ether switch unit and the second CFC's control ether switch unit serving as the protocol packet channel; or,
   a link between the first LCC's control ether switch unit and the second CFC's control ether switch unit serving as the control message channel, and a link between the second LCC's control ether switch unit and the first CFC's control ether switch unit serving as the protocol packet channel.

3. The system according to claim 1, further comprising:
   a Central Processing Unit (CPU) with two network cards, wherein the CPU is coupled with the local exchange unit, one of the two network cards is configured to exchange a control message with the local exchange unit, and the other one of the two network cards is configured to exchange a protocol packet with the local exchange unit.

4. A method for forwarding a packet, comprising:
   determining a control message channel and a protocol packet channel which are separately arranged between first and second LCC's control ether switch units in a Line Card Chassis (LCC), and first and second Central Fabric Chassis (CFC's) control ether switch units respectively in first and second CFCs; and
   transmitting a control message and a protocol packet respectively according to the determined control message channel and the determined protocol packet channel;
   wherein before transmitting the control message and the protocol packet respectively according to the determined control message channel and the determined protocol packet channel, the method further comprises:
   allocating a load to each port belonging to a Link Aggregation Group (LAG) for link aggregation between a local exchange unit and the first and second LCC's control ether switch units.

5. The method according to claim 4, wherein determining the control message channel and the protocol packet channel which are separately arranged between the first and second LCC's control ether switch units in the LCC, and the first and second CFC's control ether switch units respectively in the first and second CFCs comprises:
   stacking the first LCC's control ether switch unit with the second LCC's control ether switch unit, and stacking the first CFC's control ether switch unit with the second CFC's control ether switch unit, wherein port information of ports for forming channels are synchronized between the stacked switch units; and
   determining the control message channel and the protocol packet channel by judging, via packet negotiations, whether the ports join the Link Aggregation Group (LAG).

6. The method according to claim 5, wherein before transmitting the control message and the protocol packet respectively according to the determined control message channel and the determined protocol packet channel, the method further comprises:
   for a Central Processing Unit (CPU) with two network cards, configuring a number limit of packets of one network card for exchanging the control message with the local exchange unit to be higher than that of the other one network card for exchanging a protocol packet with the local exchange unit;
   wherein the number limit of packets of one network card comprises one of the following: the number limit of received and sent packets of one network card, the number limit of received packets of one network card, the number limit of sent packets of one network card.

7. A device for forwarding a packet, comprising:
   a determining component, configured to determine a control message channel and a protocol packet channel which are separately arranged between first and second LCC's control ether switch units in a Line Card Chassis (LCC) and first and second Central Fabric Chassis (CFC's) control ether switch units respectively in first and second CFCs; and
   a transmitting component, configured to transmit a control message and a protocol packet respectively according to the determined control message channel and the determined protocol packet channel;

wherein the device further comprises: an allocating element, configured to allocate a load to each port belonging to a Link Aggregation Group (LAG) for link aggregation between a local exchange unit and the first and second LCC's control ether switch units.

8. The device according to claim 7, wherein the determining component comprises:
   a stacking element, configured to stack the first LCC's control ether switch unit with the second LCC's control ether switch unit and the first CFC's control ether switch unit with the second CFC's control ether switch unit, wherein port information of ports for forming channels are synchronized between the stacked switch units; and
   a determining element, configured to determine the control message channel and the protocol packet channel by judging, via packet negotiations, whether the ports join the Link Aggregation Group (LAG).

9. The device according to claim 8, further comprising:
   a configuring component, configured to, for a Central Processing Unit (CPU) with two network cards, configure a number limit of packets of one network card for exchanging the control message with the local exchange unit to be higher than that of the other one network card for exchanging the protocol packet with the local exchange unit; wherein the number limit of packets of one network card comprises one of the following: the number limit of received and sent packets of one network card, the number limit of received packets of one network card, the number limit of sent packets of one network card.

* * * * *